United States Patent [19]

Troyer

[11] 4,098,373
[45] Jul. 4, 1978

[54] TUNED TORSIONAL VISCOUS DAMPERS

[75] Inventor: William J. Troyer, Orchard Park, N.Y.

[73] Assignee: Houdaille Industries, Inc., Buffalo, N.Y.

[21] Appl. No.: 820,213

[22] Filed: Jul. 29, 1977

Related U.S. Application Data

[62] Division of Ser. No. 705,158, Jul. 14, 1976, Pat. No. 4,046,230.

[51] Int. Cl.² ............................................. F16F 15/12
[52] U.S. Cl. .................................................... 188/1 B
[58] Field of Search ........................... 74/574; 188/1 B

[56] References Cited

U.S. PATENT DOCUMENTS

| | | | |
|---|---|---|---|
| 3,174,360 | 3/1965 | Katzenberger | 74/574 |
| 3,373,633 | 3/1968 | Desmond et al. | 74/574 |
| 3,410,369 | 12/1968 | Ishizuka | 188/1 B |
| 3,678,782 | 7/1972 | Aoki | 74/574 |

Primary Examiner—Duane A. Reger
Attorney, Agent, or Firm—Hill, Gross, Simpson, Van Santen, Steadman, Chiara & Simpson

[57] ABSTRACT

A tuned torsional viscous damper has mounted on a flat supporting disk a ring-shaped inertia mass comprising a pair of complementary stamped heavy gauge annular sheet metal inertia plates each of which has a radially outer axially facing annular portion in parallel shear film spaced relation to the disk body having regard to viscous damping medium in the damper, radially outer extremities of said radially outer annular portions being secured together, radially inner annular axially facing portions of substantial width of the stamped inertia plates being substantially offset axially away from the disk body by means of annular transversely angular integral offsetting bends connecting the radially inner portions to the radially outer portions, elastic tuning spring, spacing and sealing rings bonded in the recesses defined by the radially inner plate portion and extending into bonded engagement with the disk body.

10 Claims, 7 Drawing Figures

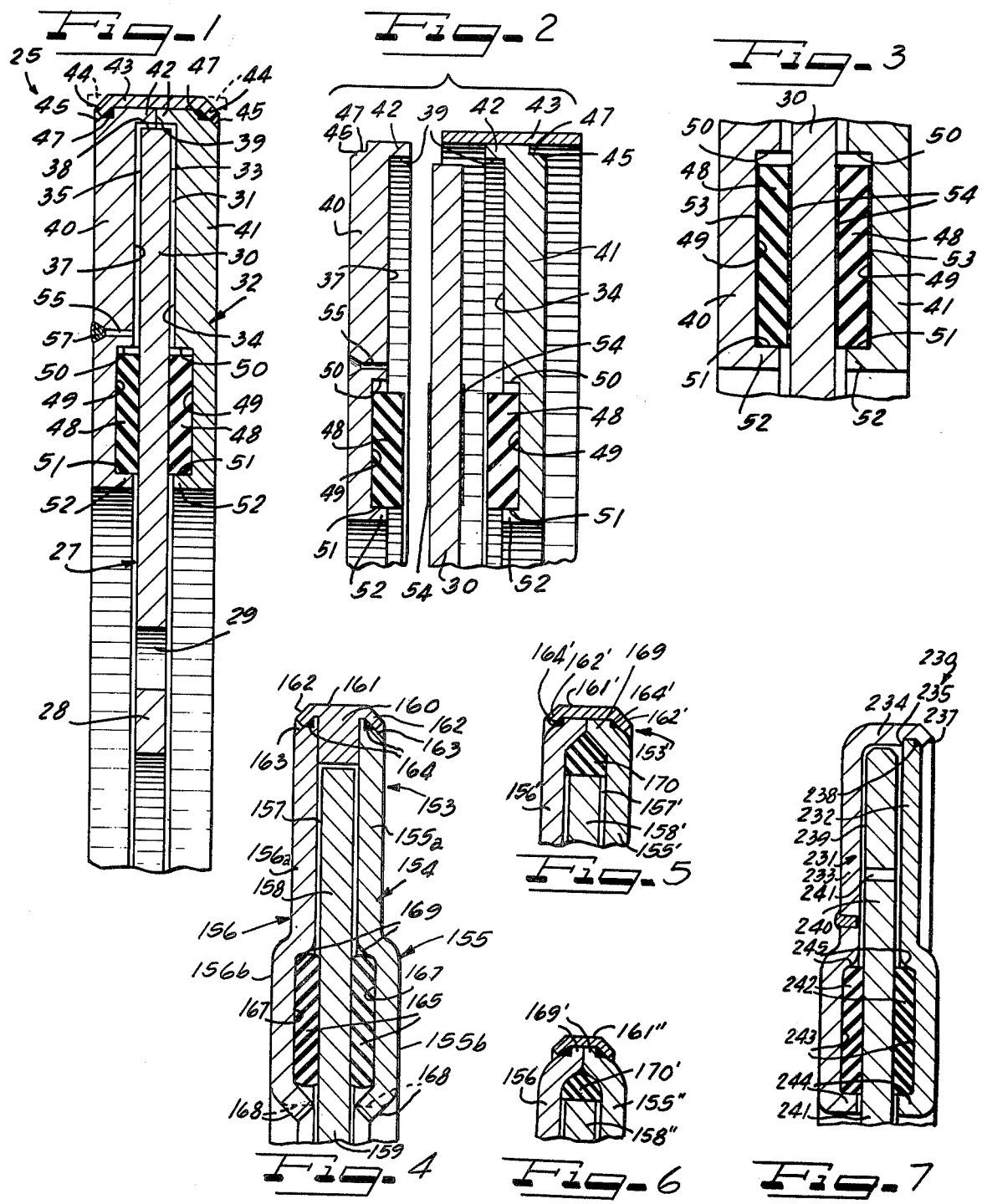

TUNED TORSIONAL VISCOUS DAMPERS

This is a division of application Ser. No. 705,158, filed July 14, 1976 now U.S. Pat. No. 4,046,230.

This invention relates generally to improvements in viscous torsional vibration dampers, and is more particularly concerned with dampers of this type in which an inertia ring is mounted on a radially extending combination supporting damper disk flange plate end mounting hub.

As is well known in the art, numerous advantages have been experienced with viscous torsional vibration dampers, that is dampers utilizing the phenomenon of resistance to shearing of a thin layer of viscous damping medium such as silicone fluid between relatively moving opposed parallel working surfaces in part corotative with a rotary member such as a crank shaft subject to torsional vibrations and in part carried by an inertia mass relatively torsionally movable with respect to the rotary member to be damped. One desirable form of such dampers comprises a disk-like flange structure having a hub portion to be attached to the rotary member to be damped and a radially extending body portion carrying a ring shaped inertia member having a working chamber enclosing an annular body portion of the disk flange structure with surfaces of the disk body and the inertia member in shear film spaced relation having regard to the viscosity of the viscous damping medium which is sealed within the chamber by means of elastic tuning spring spacing and sealing rings at the radially inner side of the working chamber.

According to several prior arrangements, of which U.S. Pat. No. 3,303,719 is representative, the sealing and spacing rings are located at juncture of the inertia member carrying portion of the mounting disk and axially extending flanges on the disk between the carrying portion and the hub portion. Such an arrangement affords little, if any, tuning advantage from the elastic rings.

As is well disclosed in U.S. Pat. No. 2,636,399, for example, an objectionable torsional vibration may occur at some speed within the normal operating speed range for the mass elastic system being damped; and to overcome this it is desirable to connect the damper inertia mass to the hub by means of rubber or rubber-like tuning spring means in such a fashion that the frequency of the spring and inertia mass is a certain percentage of the natural frequency of the entire mass elastic system, thereby providing a counteracting force which gives the damper hub and inertia mass significantly more relative movement than they would have without the tuning spring. Since the amount of friction work that can be done by the viscous damping elements and by the elastic tuning spring means is a function of the relative amplitude, dampers using the tuning spring means are capable of transforming more torsional vibratory energy into heat energy and are thus capable of reducing the torsional vibration amplitudes of the system to lower levels. This desirable effect is contingent upon being able to obtain the proper dimensions and location of the elastic spring means. In the forms of the damper shown in U.S. Pat. No. 2,636,399, the elastic tuning rings are enclosed within the working chamber in which the inertia mass is housed.

A damper arrangement of the inertia ring carried on a mounting disk type which can attain at least some tuning advantage from the greater resistance to shear of elastic bodies as compared to viscous damping medium alone is disclosed in U.S. Pat. No. 3,410,369. However, a serious deficiency in that disclosure is the high cost of production attributable to the necessity for much expensive machining of the parts of the inertia mass of the damper It is, therefore, an important object of the present invention to overcome the disadvantages, deficiencies, inefficiencies, shortcomings and problems presented by prior constructions, and to provide new and improved tuned viscous damper constructions which will efficiently meet tuning requirements in a basically torsional viscous damper of the kind having the inertia mass supported on mounting disk means.

Another object of the invention is to provide a new and improved tuned torsional viscous damper in which the structural relationships are such as to assure efficient tuning.

A further object of the invention is to provide a new and improved means for assuring substantially accurate, efficient, balanced tuning by means of elastic, i.e., rubber including elastomeric, tuning spring rings in torsional viscous dampers.

Still another object of the invention is to provide new and improved structural relationships in torsional viscous vibration dampers of the kind in which an inertia ring is supported on a combined damper disk and attaching hub member.

According to features of the invention, there is provided in a tuned torsional viscous damper, a flat supporting disk having a radially outwardly extending circular body and a radially inner hub portion adapted to be secured to a rotary member such as a crankshaft subject to vibrations to be damped by the damper, a ring shaped inertia mass having an inner diameter and a radially inward annular opening through said inner diameter and leading from an annular working chamber into which said body extends concentrically through said opening, a viscous damping medium in said chamber, said inertia mass comprising a pair of complementary stamped heavy gauge annular sheet metal inertia plates each of which has a radially outer axially facing annular portion in parallel shear film spaced relation to said disk body having regard to the viscosity of the viscous damping medium, means at the radially outer extremities of said radially outer annular portions maintaining an accurate spaced relation between said radially outer portions, means at said radially outer extremities securing said plates fixedly together, radially inner annular axially facing portions of substantial width of said stamped inertia plates substantially offset axially away from said disk body, annular transversely angular integral offsetting bends connecting said radially inner portions to said radially outer portions, whereby said radially inner portions define concentric annular recesses of substantially greater depth than said shear film spacing and facing toward said disk body, and elastic tuning spring, spacing and sealing rings substantially filling said recesses and extending across said shear film spacing into face-to-face engagement with said disk body, and thereby maintaining said shear film spaced relation between said disk body and said radially outer stamped inertia plate portions, said rings being bonded at their opposite axial faces to respectively said radially inner plate portions and to said disk body and sealing said inward opening against loss of viscous damping medium and providing tuning spring coupling between the inertia mass and the disk. dr Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 1 is a vertical longitudinal sectional detail view showing a representative damper construction;

FIG. 2 is an exploded assembly view of the damper of FIG. 1;

FIG. 3 is an enlarged fragmentary detail view of the tuning spring ring area of the damper of FIG. 1;

FIG. 4 is a vertical longitudinal sectional detail view showing one preferred embodiment of the invention;

FIG. 5 is a fragmentary vertical longitudinal sectional detail view of a modification;

FIG. 6 is a similar view showing another modification; and

FIG. 7 is a view similar to FIG. 4 and showing a further modification.

In the tuned rubber viscous torsional vibration damper 25, as shown in FIG. 1, a supporting disk member 27 may comprise a flat annular disk of suitable thickness having a radially inner hub portion 28 provided with means such as bolt holes 29 to facilitate mounting of the disks in concentric corotational relation on a rotary structure such as a crankshaft. Extending integrally radially outwardly relative to the hub portion 28 of the disk 27 is a circular body portion 30 which is received within a radially inwardly opening annular working chamber 31 defined within a ring shaped inertia mass 32. Within the working chamber 31, the body portion 30 has an axially facing working surface 33 in spaced parallel relation to a working surface 34 of the inertia mass, and an oppositely axially facing working surface 35 of the body is in spaced parallel relation to a confronting axially facing working surface 37 of the inertia mass. At its perimeter, the body 30 may have an annular radially outwardly facing working surface 38 in parallel relation to an annular radially inwardly facing working surface 39. The spacing between the various confronting working surfaces is predetermined in respect to the viscosity of a viscous damping medium substantially filling the chamber 31 to result in shear films of the medium between the parallel confronting working surfaces, having regard to the viscosity of the damping medium. Thereby relative parallel movement between the body 30 and the inertia mass 32 is resisted by the viscous damping medium acting as a viscous coupling and any relative parallel torsional movement causes laminar shearing of the viscous medium whereby energy is dissipated and vibrations are damped. The damping medium may comprise a silicone fluid of suitable viscosity for the intended purpose.

In a desirable construction, the inertia mass 32 comprises a pair of substantially equal opposite complementary inertia ring members 40 and 41 having at their radially outer perimeters spacer flanges 42 which extend into edge-to-edge abutment and substantially accurately define the spacing between the working surfaces 34 and 37 of the inertia mass. For securing the inertia ring members 40 and 41 fixedly concentric, means comprising a securing ring 43 extends about the outer perimeters of the joined inertia rings, and the opposite margins of the ring 43 are bent as by spinning or cramping from the original diameter shown in dash outline in FIG. 1 into locking flanges 44 onto chamfered shoulder surfaces 45 on the respective inertia rings, with suitable sealing means locked by the flanges 44 into grooves 47 in the surfaces 45. This hermetically seals the radially outer perimeter of the working chamber 31 defined within the inertia mass 32.

At its radially inner perimeter, the working chamber 31 is sealed by combination elastic tuning, spacing and sealing rings 48. To provide adequate mass in the rings 48 for tuning purposes they are of substantial radial extent and axial thickness and durometer for their intended tuning function. To accommodate the rings 48, each of the inertia members 40 and 41 is provided with a groove 49 at the radially inner end of the respective working surfaces 34 and 37. As will be noted, the grooves 49 are of equal depth and width and as nearly as practicable perfectly concentric. At their radially outer limits, the grooves 49 are defined by respective axially extending shoulder wall surfaces 50 defining with the radially outer sides of the rings 48 viscous damping medium reservoir spaces communicating with the chamber 31. At their radially inner sides, the grooves 49 are defined by radially outwardly facing respective shoulder wall surfaces 51 provided by solid respective axially extending inertia ring retaining and protective flanges 52 on the inertia ring members. By having the axially extending shoulders 51 axially aligned, and the tuning rings 48 of substantially the same inside diameter as these shoulders there is assured concentricity and optimum cooperative tuning function of both of the tuning rings. It may be observed that in implementation of their tuning and sealing spring function, the elastic rings 48 are desirably on the order of five or six times as wide as their thickness. To attain their spacing function, the elastic rings 48 are of sufficiently equal greater thickness than the depth of the grooves 49 so that the elastic rings project from the grooves across the shear film spacing gaps between the axially facing working surfaces on the body 30 and the inertia rings 40 and 41, thereby maintaining substantially accurate shear film spaced relation between the axial working surfaces. Desirable protection is provided by the flanges 51 against contaminants and dirt reaching and deteriorating or interfering with proper functioning of the spring rings 48.

By bonding of the rings to the root surfaces within the grooves 49 as well as to substantially equal area of the body 30, the elastic rings 48 effect thorough hermetic sealing of the working chamber 31. Such bonding may be frictional by compressive pressure against the elastic rings 48 clamped and squeezed to a thinner, wider section between the inertia rings 40 and 41 and the body 30; or the bonding may be effected by means of suitable bonding or adhesive agent with or without compressive clamping pressure upon the elastomeric rings to attain a desired tuning value. In any event, the elastic rings 48 are maintained in thoroughly concentric, stabilized tuning relation to the body 30 and the inertia mass 32. As used herein, the term "elastic" means a rubber or rubber-like elastomeric material possessing the proper elasticity for the tuning function of the rings 48. At least on those surfaces exposed to the viscous damping medium fluid, the rings 48 must be inert to such fluid.

In assembling the parts of the damper 25, as demonstrated in FIG. 2, the preformed elastic rings 48 are mounted within the grooves 49 about the shoulders 51 serving as alignment pilot means, and in an uncompressed condition the rings 48 are preferably sufficiently thicker than the depths of the grooves 49, so that when the rings are placed under compression between the inertia disks 40 and 41, they will uniformly expand in the grooves toward their radially outer sides but without filling the reservoir spaces. In the uncompressed condition, the rings 48 are of substantially differentially smaller diameter at their radially outer sides than the diameter of the groove shoulders 50, and are substantially the same diameter at their radially inner sides as the shoulders 51 of the grooves. Thereby, the radially inner shoulders 51 provide satisfactory gauging or pilot surfaces to assure substantial concentricity of the respective elastic rings 48 in the grooves facilitating economical assembly of the damper.

Bonding of the elastic rings 48 in the assembly may be simply functional, but a suitable bonding agent 53 (FIG. 3) may secure them to the root surfaces in the respective grooves 49, and the areas of the body 30 to be engaged by the elastic rings 48 may be coated with a suitable bonding agent 54. When the rings 48 are pressed against the body 30, a thoroughly bonded relationship will be assured. By bonding the rings 48 at their axially facing surfaces to the damper components, but leaving the radially facing edges of the rings 48 free with respect to the surfaces of shoulders 50 and unbonded relative to the surfaces of the shoulders 51 excellent tuned torsional damping is attained by means of the elastic spring tuning rings without detrimental distortions at the radial perimeters of the tuning rings. Bonding of the axial surfaces of the rings 48 also assures thorough hermetic sealing of the working chamber 31.

Assembly of the mechanical components of the damper is completed by squeezing the inertia disks 40 and 41 together to place the elastic rings 48 under compression and causing the radially outer spacer flanges 42 to abut, sliding the securing ring 43 into position about the perimeter of the inertia ring assembly, and bending the marginal retaining flanges 44 as by spinning into locking retaining position as shown in FIG. 1. The final step in completing the damper comprises filling the working chamber 31 with viscous damping medium as by introducing the same through a filling opening 55 which after filling is sealed by means of a plug 57. It will be understood that one or more additional openings or ports similar to the filling opening 55 may be provided for evacuation of air from within the chamber 31 in the course of filling the damper.

A damper 153 as shown in FIG. 4 is functionally similar to the damper already described, but comprises an inertia ring mass 154 formed from complementary annular inertia members 155 and 156 which are adapted to be formed up from suitable heavy gauge steel sheet metal or plate material by stamping. Between radially outer annular portions 155a and 156a of the stamped plates members 155 and 156 is defined a working chamber 157 into which extends a circular body portion 158 of a supporting damper disk 159. At their outer perimeters, the portions 155a and 156a are maintained in accurately spaced relation by an annular radially inwardly projecting spacer rib 160 on a retaining and sealing ring 161 which has annular marginal flanges 162 turned into retaining engagement with oblique shoulders 163 on the portions 155a and 156a and into sealing relation to respective grooves 164 containing a suitable sealing material. Substantially accurate shear film spaced relation of the confronting working surfaces of the portions 155a and 156a and the body 158 as well as the spacer rib 160 within the working chamber 157 is maintained by elastic combination tuning spring, spacing and sealing rings 165 seated in respective concentric annular recesses in substantially the form of rabbet grooves 167 provided by the radially inner portions 155b and 156b of substantial width of the members 155 and 156 and substantially offset axially away from the disk body. The rings 165 are maintained in concentric alignment and at least during assembly of the parts by means of angularly turned inner marginal flanges 168. Angular shoulders 169 cooperate with the radially outer edges of the rings 165 to provide annular reservoir spaces. The shoulders 169 are provided by annular transversely angular integral offsetting bends connecting the radially inner portions 155b and 156b to the radially outer portions 155a and 156a and the shoulder surfaces slope substantially obliquely radially outwardly toward the disk body 158. Although the flanges 168 may be turned to an oblique angle as shown in full outline, if preferred they may be turned to substantially right angular relation to the faces of the members 155 and 156 as shwn in dash outline. It will be understood, of course, that the elastic rings 165 will be suitably bonded at their axial faces to the respective confronting axial surfaces of the associated damper components, i.e. the disk body 158 and the inertia plate portions 155b and 156b.

In FIG. 5 the damper 153' is substantially the same as the damper 153 of FIG. 4, but the inertia members 155' and 156' are maintained in proper spaced relation by means of abutting turned spacer flanges 169 at their outer perimeters engaged by the ring 161' which in this instance does not have a spacer rib, but has the marginal turned flanges 162' retainingly engaged with the outer sides of the turned flanges 169 and in sealing engagement with sealing material trapping grooves 164'. In addition to, or instead of, the sealing grooves 164' and the sealing material therein, a sealing ring 170 may be interposed between the flanges 169 and the perimeter of the damper body 158'. On the other hand, the ring 170 may be merely in the form of a bearing ring.

In FIG. 6 another slight modification is depicted wherein the inertia members 155" and 156" terminate at their outer perimeter in abutting spacer flanges 169' which taper to a smaller dimension than the corresponding flanges in FIG. 5, whereby the retaining and sealing ring 161" is narrower, although in other respects functionally similar to the corresponding ring 161' in FIG. 5. The sealing or bearing ring 170' conforms to the shape at the inner side of the flanges 169', but is similarly oriented relative to the damper disk body 158" as in respect to the corresponding arrangement in FIG. 5.

A tuned torsional viscous damper 230, as shown in FIG. 7, comprises a ring shaped inertia mass 231 which is adapted to be formed from heavy gauge sheet steel stampings, comprising an inertia plate member 232 and a complementary inertia plate member 233, wherein the inertia plate member 233 has an axially extending radially outer flange 234 provided with a rabbet shoulder 235 engaged by the radially outer edge of the inertia member 232 and locked in place by means of a turned terminal locking flange 237 on the inertia member flange 234, and which also locks sealing material in a groove 238. A working chamber 239 defined between the members 232 and 233 receives therein a circular body 240 of a supporting disk 241, with the confronting radial and axial working surfaces within the chamber 239 in shear film spaced relation having regard to viscosity of viscous damping medium loaded into the chamber. The body 240 may have one or more axially extending fluid transfer ports 241 therethrough to facilitate equalization of viscous damping medium on both sides of the body 240. Elastic turning spring, spacing and sealing rings 242 are engaged in coaxial annular recess grooves 243 in the radially inner end portions of the inertia members 232 and 233 and facing axially toward the body 240 adjacent to the radially inward opening from the chamber 239. The elastic rings 242 engage the inertia mass members 232 and 233 in the recesses 243 and also engage with surfaces on the body 240 and are desirably bonded thereto at least frictionally, although a bonding agent may be employed if desired. Means at the radially inner sides of the grooves 243 to assure concentricity and protective enclosure of the rings 242 comprise retaining flanges 244 on the radially inner edges of the inertia members 232 and 233 and turned toward but in close clearance relation to the body 240. At the radially outer sides of the grooves 243, shoulders 245 cooperate with the elastic rings 242 to provide annular reservoir spaces. As will be observed, the shoulders 245 are inner surfaces of annular transversely angular integral offsetting bends connecting radially outer portions of the plates 232 and 233 which are in parallel shear film spaced relation to the disk body 240 and radially inner portions of the plates of substantial width substantially offset axially away from the disk body 240 and defining the recesses 243. The elastic tuning spring, spacing and sealing rings 242 substantially fill the recesses 243 and extend across the shear film spacing into face-to-face engagement with the disk body 240 and may be under compression similarly as the elastic rings 165 in FIG. 4 and the elastic rings 48 in FIG. 1.

A distinct advantage of the stamped sheet metal plate structures of the inertia ring masses in FIGS. 4–7, is that machining is reduced to a bare minimum. In FIG. 4, for example, only the abutting surfaces 163 need be machined, and in FIGS. 5 and 6 only the abutting surfaces of the flanges 169 and 169', respectively, which determine the spacing between the stamped inertia plates. In FIG. 7 only the rabbet groove 235 need be machined.

It will be understood that variations and modifications may be effected without departing from the spirit and scope of the novel concepts of this invention.

I claim as my invention:

1. A tuned torsional viscous damper, comprising:
   a flat supporting disk having a radially outwardly extending circular body and a radially inner hub portion adapted to be secured to a rotary member such as a crankshaft subject to vibrations to be damped by the damper;
   a ring shaped inertia mass having an inner diameter and a radially inward annular opening through said inner diameter and leading from an annular working chamber into which said body extends concentrically through said opening;
   a viscous damping medium in said chamber;
   said inertia mass comprising a pair of complementary stamped heavy gauge annular sheet metal inertia plates each of which has a radially outer axially facing annular portion in parallel shear film spaced relation to said disk body having regard to the viscosity of the viscous damping medium;
   means at the radially outer extremities of said radially outer annular portions maintaining an accurate spaced relation between said radially outer portions;
   means at said radially outer extremities securing said plates fixedly together;
   radially inner annular axially facing portions of substantial width of said stamped inertia plates substantially offset axially away from said disk body;
   annular transversely angular integral offsetting bends connecting said radially inner portions to said radially outer portions, whereby said radially inner portions define concentric annular recesses of substantially greater depth than said shear film spacing and facing toward said disk body;
   and elastic turning spring, spacing and sealing rings substantially filling said recesses and extending across said shear film spacing into face-to-face engagement with said disk body and thereby maintaining said shear film spaced relation between said disk body and said radially outer stamped inertia plate portions;
   said rings being bonded at their opposite axial faces to respectively said radially inner plate portions and to said disk body and sealing said inward opening against loss of viscous damping medium, and providing tuning spring coupling between the inertia mass and the disk.

2. A damper according to claim 1, wherein said radially outer portions of said stamped inertia plates have their radially outer extremities in the form of annular flanges extending toward one another, and turned end surfaces of said flanges abutting and maintaining the spaced relation of said radially outer portions.

3. A damper according to claim 1, including a ring-shaped rim element about the outer extremities of the stamped inertia plate radially outer portions and said element having turned retaining flanges securing said extremities together in the assembly.

4. A damper according to claim 1, including a sealing ring between the radially outer diameter of said disk body and the radially outer extremities of the radially outer portions of the stamped inertia plates.

5. A damper according to claim 1, comprising a spacer ring between the radially outer extremities of said radially outer portions of the stamped inertia plates, and said spacer ring being spaced from the outer diameter of said body portion of the disk.

6. A damper according to claim 1, wherein said elastic rings are under axial compression, and the radially facing edges of the elastic rings being substantially free from engagement with any part of the damper assembly.

7. A damper according to claim 1, wherein said offsetting bends have their inner surfaces sloping substantially obliquely toward said disk body, and the surfaces provide with the adjacent edges of the elastic rings viscous damping medium reservoir spaces at the radially inner side of said chamber.

8. A damper according to claim 1, including means at the radially inner edges of said elastic rings for assuring concentricity during assembly of the rings relative to said inertia mass stamped plates.

9. A damper according to claim 8, wherein said concentricity maintaining means comprise respective flanges at the radially inner edges of said radially inner portions of the plates, said radially inner flanges being bent to extend toward said disk.

10. A damper according to claim 1, wherein the only machined surfaces on said stamped plates are narrow abutting surfaces on turned flanges providing the means at the radially outer extremities of said radially outer annular portions and all other surfaces of the plates are stamp formed surfaces.

* * * * *